3,494,838
METHOD FOR THE INSTANTANEOUS QUANTITATIVE ANALYSIS OF OZONE

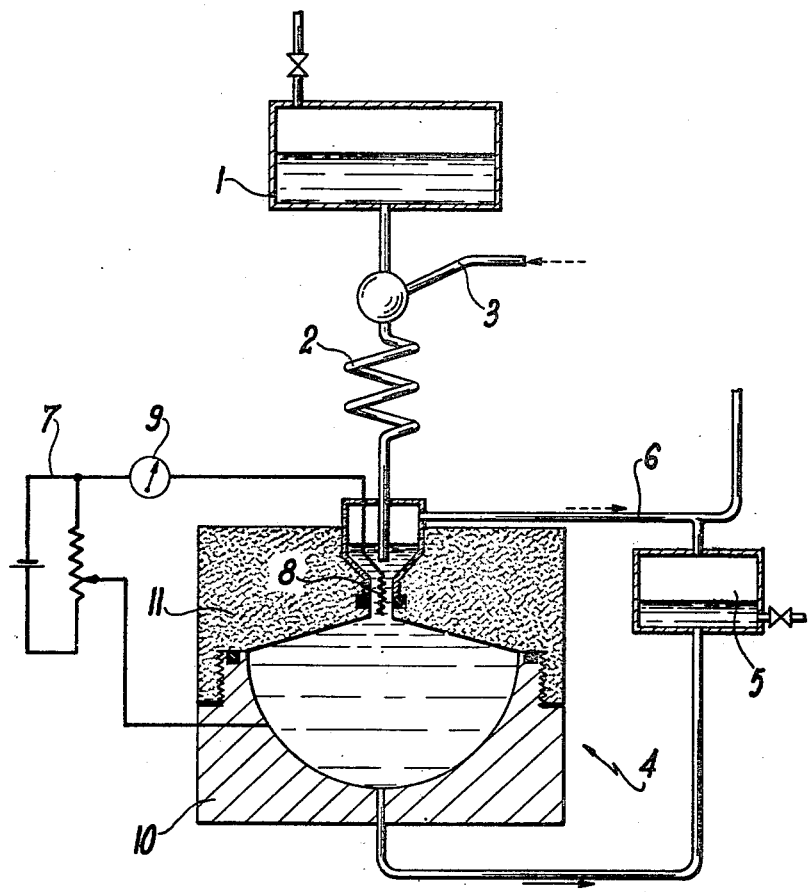

Yves Chapron, Levis Saint-Nom, Genevieve Faltot, Clamart, and Henri Francois, Paris, France, assignors to Commissariat a l'Energie Atomique, Paris, France
Filed Jan. 15, 1968, Ser. No. 698,024
Claims priority, application France, Jan. 23, 1967, 92,081
Int. Cl. B01k 3/00; C01b 13/10
U.S. Cl. 204—1                     1 Claim

ABSTRACT OF THE DISCLOSURE

The method of instantaneous quantitative analysis of ozone essentially consists in reacting ozone and oxygen catalytically by simple contact with an organic compound and in measuring the concentration of the ozonation product obtained by amperometric titration. The organic compound is chosen so that the ozonation product is a hydroperoxide, a peroxide, a peracid or a soluble perester.

---

The present invention relates to a method of instantaneous quantity determination of ozone which is applicable in particular to the ozone content in the atmosphere or in any gas which contains at least 5 volume percent of oxygen.

A number of different methods of continuous quantity determination of ozone are at present employed. It is possible to oxidize a halide and then measure the quantity of halogen which is released. The result of the measurement makes it possible to calculate the quantity of ozone which is present in the test sample. The methods differ in the measurement of the released halogen. For example, in the case of iodine, a calorimetric measurement can suitably be performed; amperometric and coulometric measurements can also be adopted. However, all of these methods suffer from a disadvantage in that they are not selective. In point of fact, there exist compounds other than ozone such as sulphur dioxide, nitrogen peroxide, which are capable of oxidizing the iodides to iodine, the bromides to bromine, the chlorides to chlorine, if they are present in the gas to be analyzed together with ozone. This gives rise to inevitable errors. Another process is based on the spectrophotometric measurement of ozone. In this case also, other compounds such as certain nitrogen oxides interfere with and impair the result of the analysis.

Finally, the ozone can be decomposed catalytically and its quantity determination is based on measurement of the unbalance of a thermistor bridge. This method is not selective since the water vapor and the peroxides affect the analysis.

The invention is directed to a method of instantaneous quantitative analysis of ozone which makes it possible to overcome the disadvantages of the methods referred to above.

The method under consideration essentially consists in reacting ozone and oxygen catalytically by simple contact with an organic compound and in measuring the concentration of the resulting ozonation product by amperometric titration.

In accordance with the invention, the organic compound such as an autoxidizable aldehyde is chosen so that the ozonation product is a hydroperoxide, a peroxide, a peracid or a soluble perester.

The method is carried out in a device comprising a measuring cell which is provided with an indicator electrode and a counter-electrode having a large surface area, one or a number of reservoirs for storage of the electrolytic medium, a mixing coil in which the electrolytic medium supplied from the reservoir or reservoirs is contacted with the air to be analyzed, a reservoir for recovering said medium after it has flowed through the measuring cell, constant-delivery pumps and regulating flowmeters for ensuring a continuous circulation and regulating the rate of flow of said medium and of the air to be analyzed through the cell.

The measuring cell employed can be of the type described in French Patent No. 1,407,694 as granted to the present applicant. However, according to the method described in the patent cited, the cell operates on the principle of a corrosion cell, in which the inidcator electrode corrodes and takes part in the reaction as a reagent. However, in the present invention, the cell operates on a different principle.

According to the invention, the indicator electrode is not corrodable and is formed, for example, of platinum or of gold. In contradistinction to a corrodable electrode, said indicator electrode does not take part in the reaction. The counterelectrode has the shape of a spherical cap and is coated internally with a metal which is non-corrodable with respect to the electrolytic medium employed. The measuring cell is made up of two blocks, namely a metallic block which constitutes the counter-electrode whilst the other block is formed of insulating material, said blocks being intended to be screwed one into the other; the insulating block is recessed in such a manner that the indicator electrode is located at an equal distance from all points of the spherical cap which constitutes the counter-electrode.

In accordance with a characteristic feature of the measuring cell, it is essential to ensure that the indicator electrode is located at the center of the sphere of which the above-mentioned cap forms an integral part. In this case, the resistance afforded to the current is identical in all directions, thereby resulting in a same overvoltage at all points and consequently a uniform distribution of the current density over the entire surface of the counter-electrode.

The device will in any case be more clearly understood from the description which now follows below, reference being had to the accompanying diagram which shows one non-limitative embodiment of the invention.

In order to permit accurate measurement of the quantity of ozone in accordance with the method contemplated by the invention, a number of conditions have to be satisfied as will be set forth hereinafter.

The amperometric titration method is based on the proportionality of the diffusion current to the concentration of the electroreducible substance to be determined. Use is made of a cell in which the electrolytic solution is circulated. Said cell comprises an indicator electrode and a counter-electrode which performs the function of reference electrode. A constant voltage is applied between these two electrodes and is set at an appropriate value to attain the diffusion current.

The ozone-containing gas under analysis can contain peroxides or hydroperoxides which are in themselves electro-reducible in the solution. It then proves necessary to adjust the potential of the indicator electrode to a correct value in order to come close to the diffusion stage of the indicating ozonation compound while ensuring that said potential is higher than that of any peroxidized compounds which are entrained with the ozone and present in the solution. Only those compounds having a potential which is higher than or equal to that of the indicator compound can produce a spurious signal. However, the method which entails the use of catalysis by ozone results in the entrainment in the catalytic oxidation of thousands of oxygen molecules in order to form the indicator compound; thus, the extraneous substances which exist in a concentration in the vicinity of the ozone or slightly higher produce a negligible signal.

The medium employed for the titration must permit both the dissolution of the ozone, the dissolution of the organic compound and of the electrolytic medium.

In order that the measured diffusion current intensity should correspond to the real ozone content, it is necessary to ensure that, at least within a given concentration range, the concentration of the peroxidized product should increase in the same proportion as the ozone content which has caused it to appear.

The oxygen is also reduced at the electrode; consequently, subject to the penalty of having a diffusion current which does not correspond to the real content, the ozonized product must have a half-wave potential which is more positive than that of the oxygen. The detector system is correspondingly more selective as this difference is greater.

A final condition to be fulfilled is that the kinetics of formation of the ozonized product must be rapid and its decomposition must take place as slowly as possible with respect to the measuring time. Any reactions between the ozonized product and the other compounds which are present in the solution must be very slow or preferably even non-existent in order that they may be disregarded during the period of measurement.

Taking these conditions into account, and using an electrode of predetermined composition, the initial concentration of the ozone can be directly related to the reading of the cell current by means of the method of amperometric titration thus adopted, provided that it is performed within a suitable range of concentration.

The method of amperometric titration has the advantage of being applicable to very low concentrations of substance inasmuch as the currents obtained are still measurable at concentrations as low as $10^{-5}$ M; but the method referred to is correspondingly more effective in the case of higher concentrations ranging from $10^{-5}$ to $10^{-2}$ M, which is the case in the application of the invention to the determination of atmospheric ozone.

There will now be given by way of explanatory illustration one non-limitative example of application according to the method of the invention; and the complete equipment employed for the purpose of carrying out the method of determination of ozone according to the invention will be described with the aid of the single accompanying figure.

The electrolytic solution contains the organic compound which, in the presence of ozone, subsequently yields the soluble peroxidized product. In the example of application chosen, this organic compound is a 25 volume percent solution of benzoic aldehyde in acetic acid. Current transport within the cell is ensured by lithium perchlorate. An absorber makes it possible to dissolve the ozone contained in atmospheric air in the electrolytic solution referred to above and the presence of the ozone gives rise to the catalytic reaction which yields benzoic peracid, then to the reaction which yields benzoic acid:

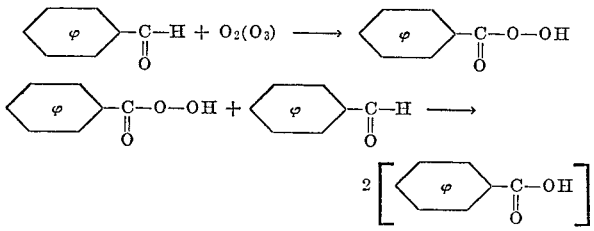

The peracid forms very rapidly and its decomposition to acid is a much slower process since a further interval of 12 hours must be permitted to elapse before it has completely disappeared. It is reduced to zero potential with respect to the saturated calomel electrode which can serve as reference electrode. Under these conditions, other peroxides which are present in the solution do not interfere with the measurement inasmuch as their electrochemical reduction takes place at a potential which is usually below zero. Furthermore, the ozone which is present in the atmosphere in a proportion which is of the order of $10^{-2}$ p.p.m. catalyzes the fixation of more than 2,000 molecules of oxygen per molecule of ozone; in the case of an atmospheric concentration taken at $10^{-8}$ molecule of ozone, there is formed a minimum of $3 \times 10^{-4}$ molecule of benzoic acid.

In the case of a concentration factor which can attain 100 within the absorber, the resultant concentration of peracid can readily be measured by amperometric titration.

In another example of application, the organic compound is constituted by 25 volume percent heptanal in carbon tetrachloride. Current transport within the cell is ensured by molar tetramethylammonium chloride. An absorber makes it possible to dissolve the ozone of the atmospheric air in the electrolytic solution and its presence gives rise to the catalytic reaction which yields enanthic peracid, then to the reaction which yields enanthic acid:

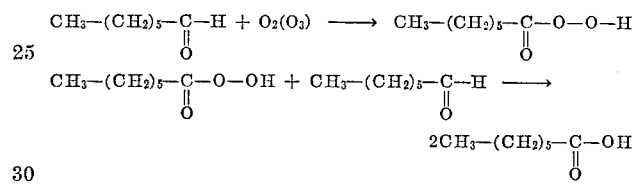

However, this reaction is 2.5 times more responsive to ozone than the reaction which is carried out with benzoic aldehyde; under these conditions, $10^{-2}$ p.p.m. of ozone should give approximately $7.5 \times 10^{-4}$ moles per liter of peracid, namely 75 microamperes in the diffusion state with an electrode of 0.1 cm$^2$.

It would also have been possible to employ butyric aldehyde in solution in acetic acid, current transport being carried out by the lithium perchlorate.

The figure represents the cell and the complete device which permits the practical application of the method of analysis of ozone in accordance with the invention.

The device comprises a reservoir 1 containing the organic product which is solubilized or which may if necessary be dispersed in a fine suspension in a suitable electrolyte; said reservoir is closed at the top in order to be protected from the atmosphere. The electrolytic medium is fed into the mixing coil 2 or helical capillary tube and contacted therein with the air to be analyzed which is derived from the pipe 3. The soluble peroxidized product is formed within said capillary tube. The liquid then flows through the measuring cell 4 and reaches the recovery reservoir 5 whilst the analyzed air flows out through the pipe 6. Pumps and regulating flowmeters (not shown in the figure) ensure a continuous circulation of the electrolytic medium and accurate regulation of the air to be analyzed. A potentiometric circuit 7 serves to apply a suitable voltage to the indicator electrode 8. A microammeter 9 indicates the current intensity which results from the electrochemical reduction.

The cell 4 is made up of two blocks which are screwed one into the other. The lower block 10 is of stainless steel and provided with a hemi-spherical recess, the internal surface of which is either platinum-plated or gold-plated. The counter-electrode is formed by the internal surface of this half-sphere and a substantial surface area thereof is in contact with the solution, thereby having a stabilizing effect on the potential of said counter-electrode. An upper insulating block 11 completes the cell and is also provided with a recess, the lower portion of which is frusto-conical whilst the upper portion of which is cylindrical. The two portions communicate with each other through a neck in which is located the indicator electrode 8 which can be formed of a noble metal such as platinum or gold.

For starting the device, it is merely necessary to apply a suitable direct-current voltage between the counter-electrode and the indicator electrode by means of the potentiometric circuit and to actuate the pumps and flowmeters.

The method of titration which is carried out in accordance with the invention has the advantage of permitting of continuous recording of the ozone content of the atmosphere or of any gas which contains at least 5% oxygen.

The selectivity of the method is very good: the peroxides, peracids, hydroperoxides, peresters and other oxidizers which reduce to a more negative potential than the peroxidized indicator compound will not produce any signal.

Moreover, if the medium, the electrolyte, the organic compound as well as the ratio of velocities of the fluids within the absorber are correctly selected, excellent responsiveness is achieved as has been pointed out earlier.

What we claim is:

1. A method of instantaneous quantitative analysis of ozone comprising contacting an organic compound with an ozone-containing sample to form an ozonation product selected from the group consisting of a hydroperoxide, a peroxide, a peracid and a soluble perester and amperometrically determining said product to provide an indication of the ozone content of the sample.

References Cited
UNITED STATES PATENTS 3,234,117    2/1966    Rost et al. _____ 204—195

FOREIGN PATENTS 1,407,694    6/1965    France.

TA HSUNG TUNG, Primary Examiner

U.S. Cl. X.R.

23—232; 204—195